Dec. 6, 1949     O. B. TWEETEN     2,490,388
DITCHING MACHINE
Filed Sept. 30, 1947     6 Sheets—Sheet 1
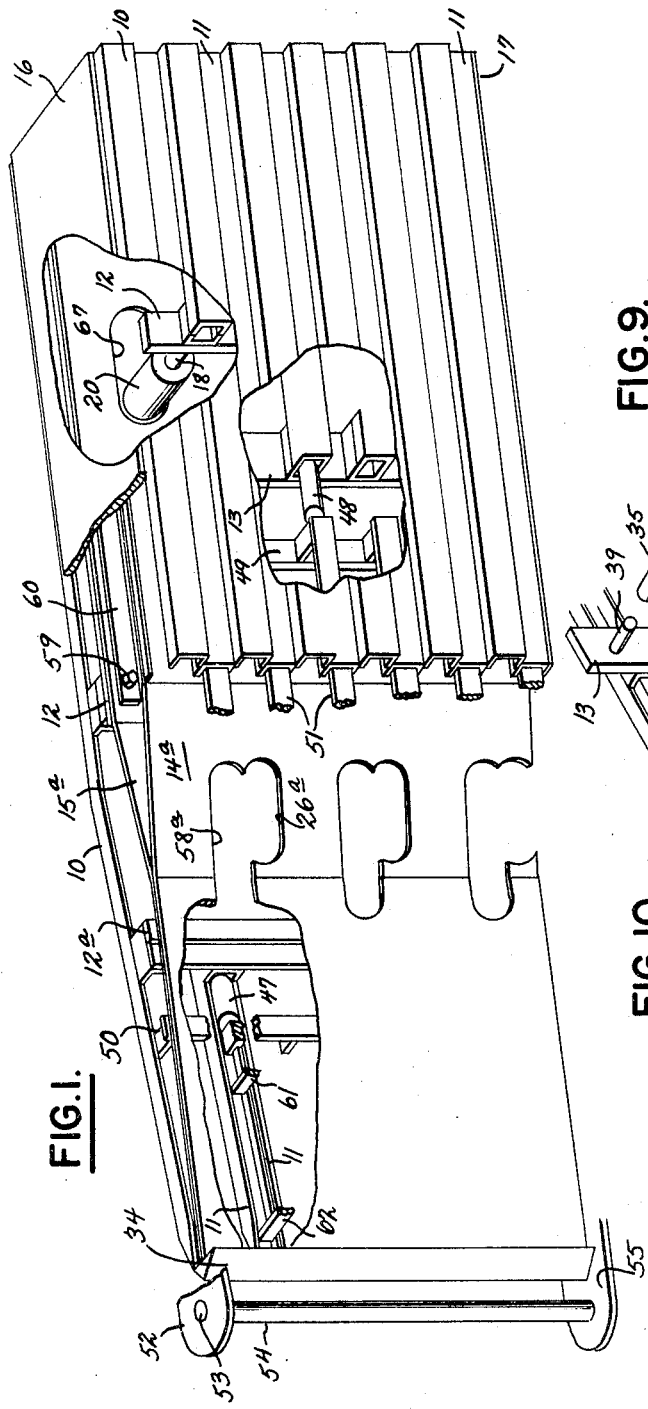
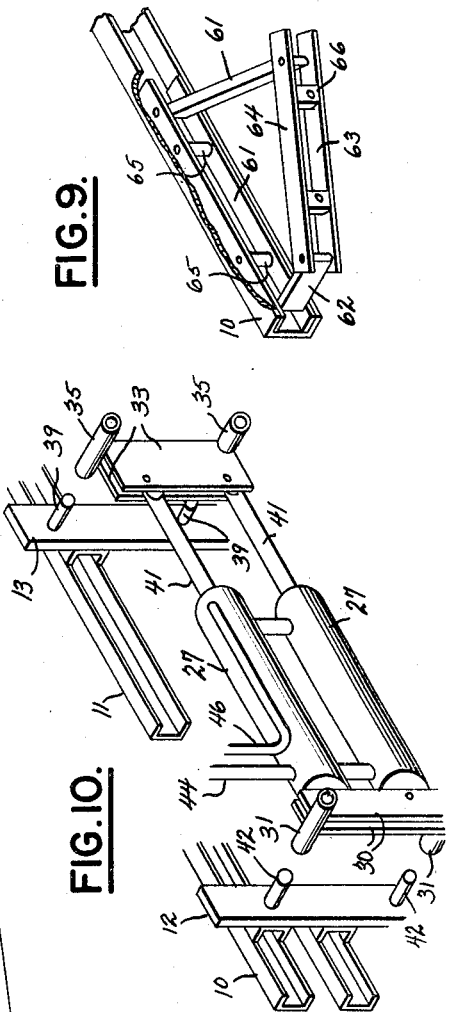
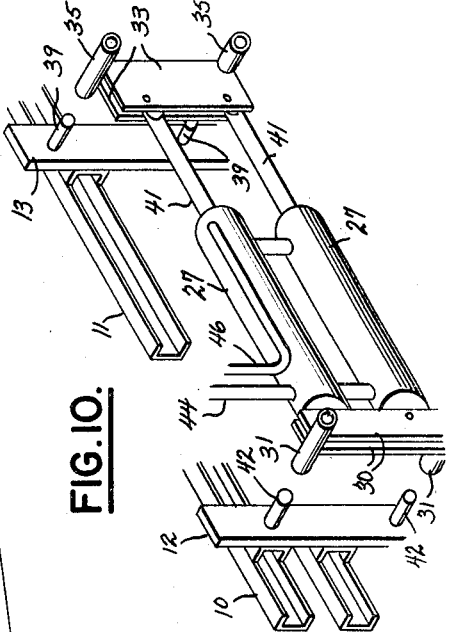
INVENTOR
Oliver B. Tweeten
BY Mawhinney + Mawhinney
ATTORNEYS Dec. 6, 1949 O. B. TWEETEN 2,490,388
DITCHING MACHINE
Filed Sept. 30, 1947 6 Sheets-Sheet 2
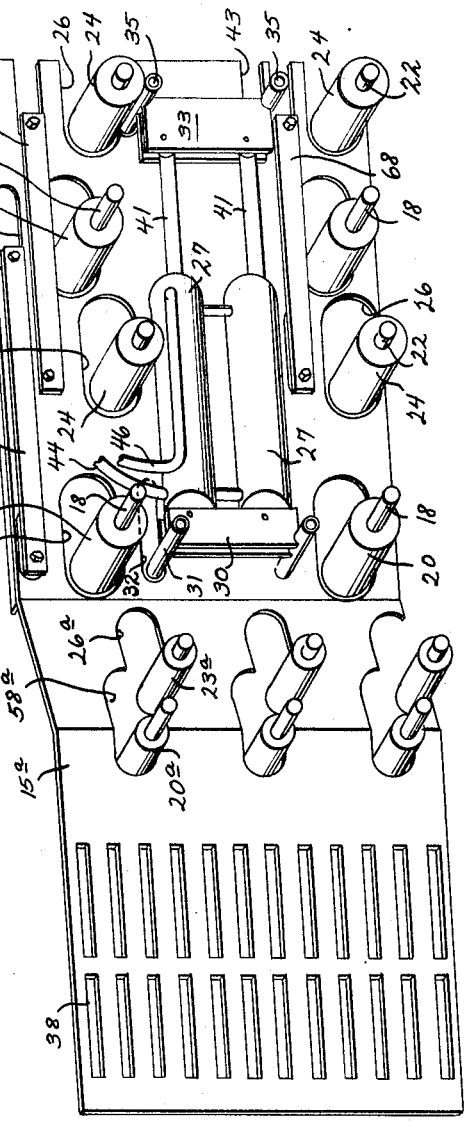
INVENTOR
Oliver B. Tweeten
BY Mawhinney & Mawhinney
ATTORNEYS Dec. 6, 1949  O. B. TWEETEN  2,490,388
DITCHING MACHINE Filed Sept. 30, 1947  6 Sheets-Sheet 3

INVENTOR
Oliver B. Tweeten
By Mawhinney + Mawhinney
ATTORNEYS

Dec. 6, 1949     O. B. TWEETEN     2,490,388
DITCHING MACHINE

Filed Sept. 30, 1947     6 Sheets-Sheet 4

INVENTOR
Oliver B. Tweeten

BY Mawhinney & Mawhinney
ATTORNEYS

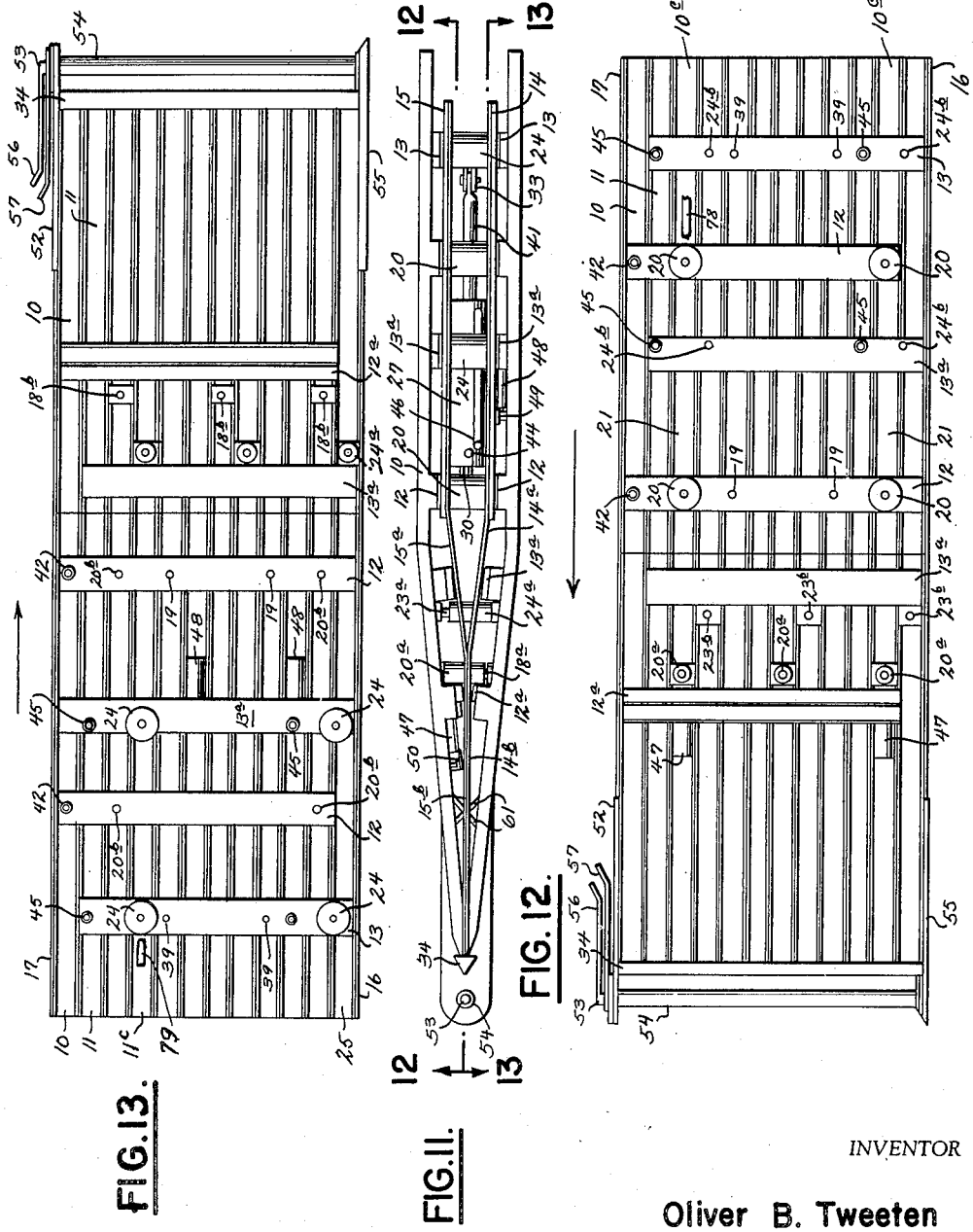

Dec. 6, 1949  O. B. TWEETEN  2,490,388
DITCHING MACHINE
Filed Sept. 30, 1947  6 Sheets-Sheet 6
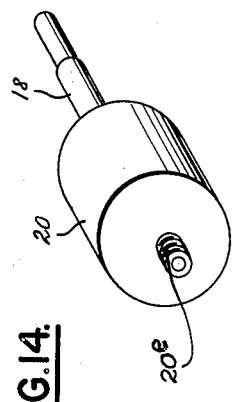
FIG.14.
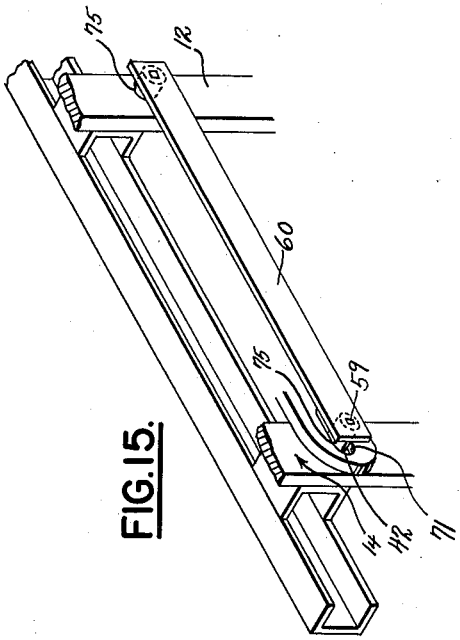
FIG.15.
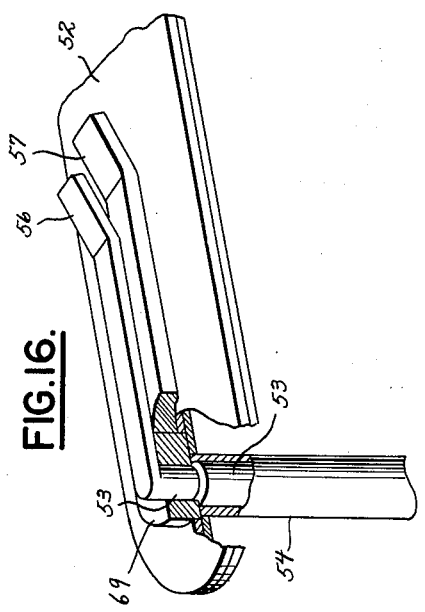
FIG.16.
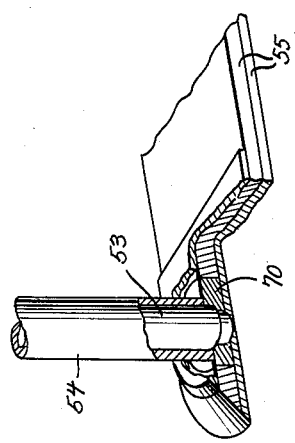
INVENTOR
Oliver B. Tweeten
BY Mawhinney + Mawhinney
ATTORNEYS Patented Dec. 6, 1949

2,490,388

UNITED STATES PATENT OFFICE 2,490,388

DITCHING MACHINE

Oliver B. Tweeten, Forest City, Iowa

Application September 30, 1947, Serial No. 777,095

12 Claims. (Cl. 37—98)

The present invention relates to improvements in ditching machines, and the primary purpose of the invention is to provide an improved machine which will dig ditches without the use of some type of cutting wheel or cutting device.

Another object of the invention is to provide an improved ditching machine which accomplishes its excavating work by simply pushing the earth to the sides of the ditch without requiring any means for removing the earth from the ditch.

Another object of the invention is to provide a ditching machine which will form a ditch without the removal of the earth therefrom and which therefore has the advantage of eliminating any subsequent machinery needed to refill the ditch by reason of the fact that originally the earth is not removed but is merely pushed to the sides of the ditch and therefore need only be loosened to refill the ditch after the laying of tile or the like.

A further object of the invention is to spread the earth by means of a self-propelled machine that "walks" along the sides of the ditch by the use of two series of runners which are independently projected and retracted laterally of the frame of the machine whereby when one set of the runners is projected firmly out against the side walls of the ditch, the frame and the companion set of runners is driven forwardly whereupon such companion runners are projected laterally out to bind against the side walls of the ditch while the first projected set of runners are retracted, moved forward and subsequently expanded; such cycle of operations being repeated until a ditch or trench of the requisite length is produced.

The machine will also be found useful in shoring and compacting and widening the sides of ditches already dug.

With the foregoing and other objects in view the invention will be more fully described hereinafter and more particularly pointed out in the appended claims.

In the drawings, in which like parts are denoted by the same reference characters throughout the several views, Figure 1 is a fragmentary perspective view, with parts broken away and parts shown in section, of an improved ditching machine constructed in accordance with the present invention;

Figure 2 is a similar view taken through substantially the longitudinal center of the machine;

Figure 3 is a top plan view of the machine with both sets or series of runners in the collapsed or retracted position;

Figure 9 is a fragmentary perspective view showing the forward cross head connection to the runner bar;

Figure 10 is a fragmentary perspective view of the propelling hydraulic system showing its relation to the runners;

Figure 11 is a top plan view of a complete assembled machine with the top plate removed;

Figure 12 is a vertical longitudinal section of Figure 11 taken on the line 12—12 in Figure 11;

Figure 13 is a similar view taken on the same line in Figure 11 and looking in the direction of the arrows 13—13;

Figure 14 is a perspective view of one of the spreader cylinders;

Figure 15 is a fragmentary perspective view of a section of runner with frame brace; and Figure 16 is a fragmentary perspective view of the steering system of the present invention with parts broken away.

Referring more particularly to the drawings, the frame of the machine comprises two vertical plates 14 and 15 spaced laterally apart to opposite sides of the center line of the machine and being substantially in parallelism. These plates are all metal and are welded or otherwise secured to top and bottom plates 16 and 17 respectively.

These vertical frame plates 14 and 15 are carried into forward extensions 14ª and 15ª which converge together and merge forwardly into contacting plates 14ᵇ and 15ᵇ which are welded rigidly or otherwise secured together and which carry at their forward ends a beveled, sharpened or arrow-formed nose 34 adapted to engage the head wall of the ditch or trench.

Figure 7:
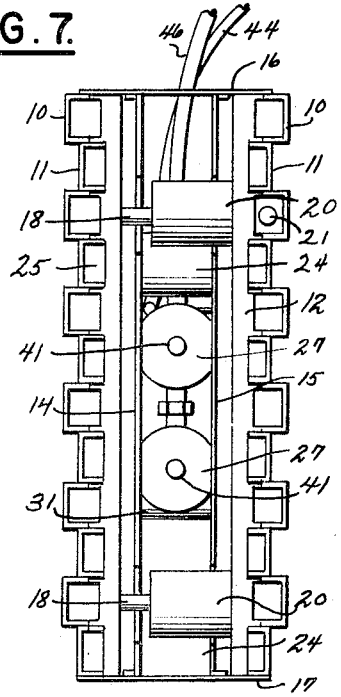
Figure 7 is a cross section taken on the line 7—7 of Figure 4 and showing one series of runners expanded.

From Figure 7 it appears that the top and bottom plates 16 and 17 project laterally beyond the main frame vertical plates 14 and 15 and with such plates form spaces for accommodating the runners and for preventing dirt from entering the inner working mechanism of the machine.

Such runners are preferably provided in two series 10 and 11 at each side of the machine. The runners of one series 10 alternate with the runners 11 of the other series. Such runners are movable laterally in and out relatively to one another and relatively to the machine frame. In the embodiment of the invention shown in the drawings, there are six runners in each series, set or group at each side of the machine, totaling twenty-four runners in all. Such runners assist to mutually support one another and are in part supported by the outwardly projecting portions of the bottom plate 17 and are confined by the laterally projecting portions of the upper plate 16.

Such runners are also partly supported by the vertical bars 12 and 13. The runners comprising the group 10 at one side may be welded or otherwise affixed to the bars 12 of which there may be three or any other number spaced apart along the longitudinal dimension of the machine. The vertical bars 13 may also be three in number and similarly spaced to which are welded or otherwise secured the second set or series 11 of the runners. Two of the channel runners 10° and 11° on each side of the machine are made of closed structure and are employed as oil supply lines to the spreader cylinders 20 and 24, thus eliminating the need of internal pipe lines within the working or propelling part of the machine. It also eliminates the need of flexible conduit which is expensive and not completely satisfactory for hydraulic use under pressure.

The bars 12 of one group at one side of the machine will be laterally opposite the similar bars 12 of the runner series 10 at the other side of the machine. In like manner the bars 13 of the runner series 11 at both sides of the machine will be laterally opposed to one another. The vertical bars 12 and 13 which carry runners 10 and 11 are joined by retaining bars 60 and 68 respectively, which ride on the inside of the two side wall frames 14 and 15 and are carried by spacers 75, one end of which is affixed to bar 12 or 13 and the other end of which is affixed to the bar 60 or 68. The spacers pass through horizontally elongated slots 71 as best seen in Figures 2 and 15. These bars 60 and 68 hold the machine together when it is taken from the ditch or is in transit to the job.

Transverse hydraulic cylinders 20 in any suitable numbers are disposed with their axes transversely of the frame with their rams 18 extending transversely and affixed to the bars 12 as by providing the cylinders 20 at one end with a threaded neck 20° having an opening therethrough as best seen in Figure 14. The neck 20° is adapted to threadedly engage the bars 12 and to communicate oil from the bars 12 to the cylinders 20 as more fully set forth hereinafter. As shown in Figure 2 these cylinders 20 are disposed in vertical pairs and three such pairs are shown distributed over the length of the machine to accord with the three vertical bars 12 employed. The cylinders 20 and 24 are offset to one side of the machine. The cylinders 20 are toward frame 15 and 24 toward 14. The reason for this is that the cylinders have one end fastened securely so that oil can be piped to it without using flexible tubing. The cylinders 20 are fastened to runners 11 on the right side of Figure 8, and the cylinders 24 are fastened to the left side of Figure 8. The reason for having them fastened on different sides is so that the oil lines do not interfere with one another. Referring to Figure 14 the oil is brought into the cylinders through an opening at one end. The cylinders sit right above certain runners which have had a piece of metal welded over them so that the oil is carried inside of the runners. Refer to Figure 13.

The channel 10°, third from the top in Figure 13, is covered so that it will hold oil. Oil comes in from the back of the machine through a tube 78 which is in turn fastened just behind the bar 12. From there the oil flows through the channel supplying cylinders 20, 20ª, and 47. The bar 12ª is also made hollow so that it will carry oil down to the other two cylinders 20ª and to the cylinder 47 at the bottom. The channel second from the bottom is also covered and oil is supplied to the other two cylinders 20 at the bottom.

Referring to Figure 12, this is the other side of the machine. Counting from the top of the machine, the oil is pumped into the fourth channel 11°, which is covered as are the channels 10° on the other side, by tube 79. The cylinders 24 are adjacent to the hollow bar 12 and are screwed into it. The two cross bars 13ª are hollow, thus allowing the oil to get to the bottom side of the machine. The reason for having two such hollow bars is to permit cylinders 24ª and 48 to be filled at the same time.

Other cylinders 24 having rams 22 are likewise disposed in pairs and connected to the vertical bars 13 at opposite sides of the machine.

Horizontally elongated slots 26 are made in the vertical frame plate 15 to accommodate the hydraulic cylinders 20 and 24. The frames 14 and 15 are carried forward by the runners as they engage the nose 34. The frame is also carried forward by pins 42 and 45 which pass through the frame and are secured to the rods 60 and 68 as best seen in Figure 2.

Two double-acting hydraulic cylinders 27 are vertically disposed lengthwise of the machine between the frame plates 14 and 15 and receive their oil supply through pipe lines 44 and 46. These cylinders "float" inside the machine by reason of their mounting. One end of each of the cylinders 27 is connected to the cross-head 30 shown more particularly in Figure 2 where such cross-head is shown to carry tubes or sleeves 31 slidably telescoped over pins 42 projecting inwardly through the frame 15 via elongated slots 32 from one pair of the bars 13 carrying runners 11.

A rear cross-head 33 is connected to the working end of rams 41 and carries tubes or sleeves 35 slidable in longitudinally elongated slots 43 in the frame plates and telescopingly engaging the pins 39 projecting inwardly from a pair of bars 12 which carry runners 10.

The cylinders 27 have a ram at one end only. The piston head on the ram 41 is driven towards either end of the cylinder by applying hydraulic pressure to the opposite end, viz., to drive the ram 41 forwardly oil is forced into the rear portion of the cylinder 27 via supply line 46 and the pressure vented off the other end of the cylinder via line 44 thus permitting the forward movement of the ram 41.

As shown more particularly in Figures 1, 9, and 12, the forward ends of the runners 10 and 11 are forced outwardly by a sliding wedge which consists of a slide 63 and 64, one end of which is fastened to one side of one runner, either 10 or 11, as by bolts passing into support 66. The support 66 is welded or otherwise affixed to slide 63 and 64. Connecting links 61 and 62 are pivotally carried by slide members 63 and 64. Slide members 64 are slidably carried in the channel runners on rollers 65. Connecting links 61 and 62 pass through horizontally elongated openings 38 in frame plates 14 and 15 as best seen in Figures 2 and 12. Hydraulic cylinders 47 and 48 are carried within a channel member and receive their oil supply from hollow bar 12ᵃ as best seen in Figure 1. Each runner has an expander unit as described above. The expanders for the runners 10 are united by a bar 50.

As best seen in Figure 1 the expanders for the runners 11 are united by a bar 49. Bars 51 are provided to link the cylinder 48 and slide members 63 of runners 11.

Referring more particularly to Figure 16, the steering device for the present invention will be more clearly understood wherein plates 52 and 55 are leading extensions of plates 16 and 17 through the upper of which passes concentric shafts 53 and 54. The outer shaft 54 is rigidly affixed to cam 70 which is rotatably embedded in the base plate 55; while the inner shaft 53 has affixed thereto a cam 69 which is rotatably embedded in plate 52. Operating handles 56 and 57 are affixed to shafts 53 and 54 respectively. The operation of the steering system will be more fully described hereinafter.

Figure 6:
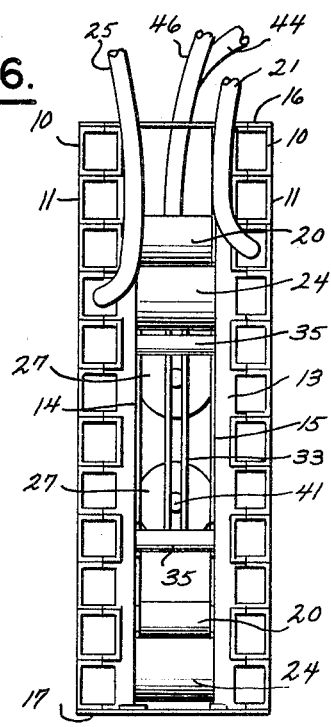
Figure 6 is a transverse section taken on the line 6—6 in Figure 3 and showing both series of runners contracted.

In operation, Figures 3 and 6 show the machine in the condition in which it is placed in the ditch. Both series of runner bars 10 and 11 are collapsed inwardly to their innermost positions. A convenient form of the machine in this condition is confined to a lateral dimension of twelve inches. It will be understood that a single hydraulic control valve may be used to govern all of the operations in sequence of the machine. In the original collapsed condition of the machine all ports of the valve will be closed.

Figure 4:
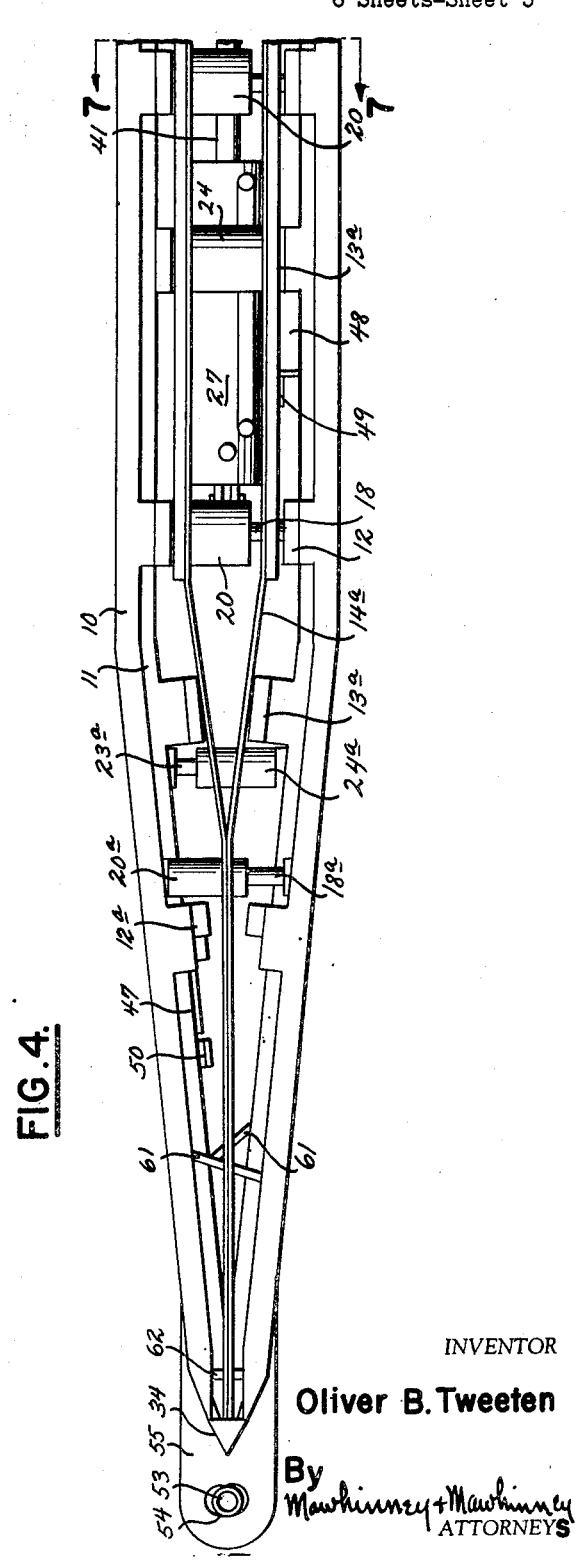
Figure 4 is a similar view showing one set of the runners expanded.

In Figures 4 and 7 series or group 10 of the runners is shown in the expanded condition. In this expanded condition the runners 10 forcibly grab the sides of the ditch. In fact through the tremendous force of hydraulic pressure such runners 10 force back the wall of the ditch with great pressure and compaction. To secure this action the valve is moved to a position where all of the hydraulic cylinders 20 are open to the pump; and all of the remaining cylinders are closed off from any access to the pump.

The next action is to adjust the valve whereby hydraulic fluid is turned into the rearward end of the double-acting hydraulic longitudinal cylinders 27. At the same time the front end of these hydraulic cylinders 27 are evacuated whereby any residual liquid therein may run out and return to the sump. The entrance of hydraulic pressure at 46 causes the cylinders 27 and their cross-head 33 to be advanced forwardly carrying therewith the retracted series of runners 11. For this purpose the sleeves 35 of the cross-head 33 may move forward in the horizontally elongated slots 32 of the frame plates 14 and 15. The runners 11 may be pushed ahead for a distance of say six inches. If desired, the sleeves 35 may engage the forward end walls of the slots 32 and carry the frame ahead with such cross-head 33. In so doing the wedge nose 34 and the diagonal extensions of the runners at the front of the machine will push the earth to opposite sides of the machine. In fact the entire forward portion of the machine acts in a wedge-like manner.

Figure 8:
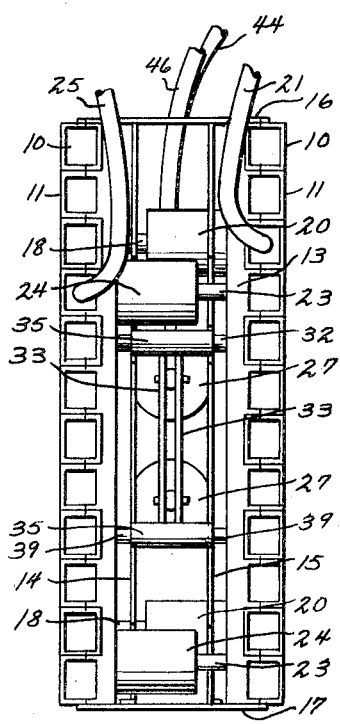
Figure 8 is a view similar to Figure 7 with both sets of runners expanded.

As soon as the spreaders 11 are in the forward position they may be expanded by turning hydraulic fluid into the cylinders 24. This expansion is permitted by the pins 39 sliding outwardly in the sleeves 35 of the cross-head 33. This expansion or projection of the runner series 11 further spreads the earth and these spreaders now grab forcibly onto the sides of the ditch. The valve in this position simply opens the cylinders 24 to the pump; all other cylinders 20 being shut off from access to such pump. This position of the parts is shown in Figure 8 where both series or sets 10 and 11 of the runners are in the expanded condition so that the wall of the ditch is uniformly compressed on both sides.

The next step is to withdraw or contract the runner group 10. This is accomplished by moving the valve to continue to introduce hydraulic pressure to the cylinders 24 but to evacuate the cylinders 20 to the sump and likewise the pipe 46 is evacuated to the sump.

Figure 5:
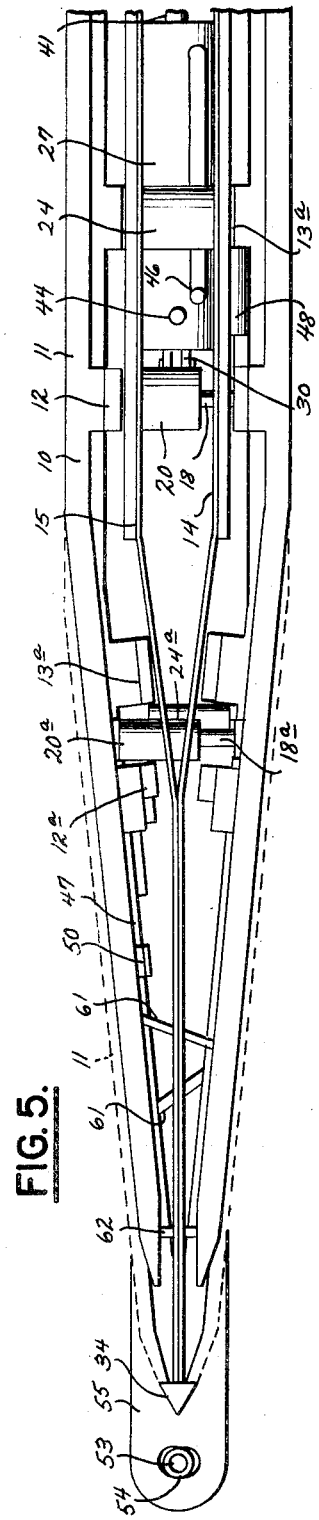
Figure 5 is a fragmentary top plan view showing in full and dotted line positions the forward movement of the runners.

The runners 11 are now supporting the machine while the runners 10 are retracted and ready to be pushed ahead. This action is shown in Figure 5 and is accomplished by turning hydraulic fluid into the front portion of the double-acting hydraulic cylinders 27 through the supply pipe 44 which drives the ram 41 rearwardly and pushes the cylinders 27 and cross-head 31 forwardly. The sleeves 35 move in the frame slots 43 and draw the pins 39 forwardly, which pins are attached to the runner bars 13. The relation of the slots 43 to the sleeves 35 is such that when the cross-head 33 has made a forward traverse of say six inches the sleeves 35 engage the forward edges of the slots 43 and entrain the frame to move forwardly with the cross-head 33. The ram and cross-head travel of cross-head 33 may be twelve inches of which the first six inches is taken up in merely moving the runners 11 forwardly with respect to the machine; while the last six-inch travel carries forwardly the frame along with the runners 11, the frame and the runners 11 sliding forwardly on the other group or set of runners 10 which is fixed to the wall of the ditch and gives the necessary purchase for the reaction of the machine in pushing forwardly against the head wall of earth. This six-inch forward movement of the machine is relative to the stationary set runners 10 so that the slots 32 of the frame move forwardly relatively to the sleeves 31 of the forward cross-head 30 thus placing the forward cross-head 30 in a position to drive its runner group 10 forwardly for a distance before picking up the frame to move along therewith. Obviously for this forward movement of the runners 11 and of the frame the supply pipe 46 is open to the pump while the cylinders 20 and the supply pipe 44 are open to the sump.

The next position begins the cycle all over in which the hydraulic cylinders for the runners 10 are opened to cause expansion of the same. The valve position is simply that of turning hydraulic pressure into the cylinders 24 and 48.

In the next operation the spreaders 11 must be released and moved away from the side of the ditch; in other words collapsed inwardly. This is accomplished by opening the cylinders 24 to the pump and opening the cylinders 20 and the rear end of the double-acting cylinders 27 to the sump. When plotting the valve system back pressure from the hydraulics in the machine must be taken into account but the valve system may be carried out in any suitable manner and is not particularly a part of the present invention.

In ditching, especially for drain tile or the like, it is often desirable to run a curved trench, that is to say, one with turns to evade obstructions; it is often the case that all ditching is not along a straight line, therefore it is necessary to provide the ditching device with steering means. Referring more particularly to Figure 16, the operation of the steering system may be more fully understood. When both operating levers 56 and 57 are in the position shown, the machine will go straight ahead; however, to cause the machine to turn to the right, both handles 56 and 57 are moved to the left. This turns the inner shaft 53 which is secured to the cam 70 at the bottom of the machine where it can be seen that cam 70 is set into plate 55. Upon the moving of handle 57 to the left, cam 69 to which it is secured is caused to turn. It will be noted that cam 69 is embedded in plate 52 in which it is free to turn. This turning action of cam 69 moves outer shaft 54 to the right.

To cause the machine to turn to the left, the handles 56 and 57 are moved to the right.

The machine can be caused to tilt in the ditch when such action is desired by moving say handle 56 to the right and handle 57 to the left. This steering device causes such steering movement by crowding more dirt to one side of the machine than to the other.

While I have disclosed herein the best form of the invention known to me at the present time, I desire it to be understood that I reserve the right to make changes and modifications in the herein described embodiment of the invention provided such changes fall within the scope of the following claims.

What I claim is:

1. In a ditching machine, a frame, two series of runners carried at each side of said frame and movable laterally in and out with respect to each other and with respect to said frame, means for expanding one series of runners against the side of the ditch while the second series of runners remains retracted, means for driving the frame forwardly while the first series of runners is thus expanded, said driving means subsequently carrying the second series of runners, in their retracted condition, forwardly with said frame, and means for laterally expanding said second series of runners in the forwardly moved position, said first series of runners being permitted to retract, said driving means moving said first series of runners forwardly, with respect to said frame and second series of runners, up to the new position taken by said frame.

2. The combination as claimed in claim 1 characterized by the fact that hydraulic rams are connected to said runners for expanding and contracting the same.

3. The combination as claimed in claim 2 characterized by the fact that a driving hydraulic ram is arranged to drive the frame and second series of runners forwardly using the purchase of the first series of runners to react against, said driving ram moving the first series of runners forwardly relative to the frame and to the second series of runners when the latter have been expanded in the forward position of the frame.

4. The combination according to claim 1 characterized by the fact that the frame comprises laterally spaced vertical plates and top and bottom plates with the top and bottom plates projecting laterally beyond the vertical plates and forming with the vertical plates side recesses of the frame to receive said runners.

5. The combination of claim 2 characterized by the fact that the hydraulic rams fit through horizontally elongated slots which permit of relative movement of the frame and runners in a forward direction.

6. The combination of claim 2 characterized by the fact that the runners are secured to vertical bars and the vertical bars in turn connected with the hydraulic rams.

7. In a ditching machine, a frame comprising laterally spaced vertical side plates having forward portions brought together and secured to one another, a pointed nose carried by the forward ends of said plates, means to hold said plates in the spaced apart relation, two series of runners carried outwardly at opposite sides of said plates and being laterally movable with respect both to the frame and to each other, means for independently expanding the runners, which are subsequently permitted to retract, one series of runners being longitudinally movable with reference to said frame, means for so longitudinally moving said runners as to take up new forward positions at each subsequent forward movement of the machine and the companion runners, and means for forwardly moving said machine and companion runners while the latter are retracted.

8. A ditching machine as claimed in claim 7 characterized by the fact that said runners have forward convergent extensions, the front ends of which are adapted to fit behind the shoulders of an arrow-shaped forward nose carried by said frame.

9. A ditching machine as claimed in claim 8 characterized by the fact that sliding wedges are mounted in the forward extensions of the runners to expand such extensions simultaneously with the expansion of the connected runners.

10. A ditching machine as claimed in claim 7 in which the means for driving the frame and the runners forwardly are hydraulic cylinders and rams mounted in said frame and cross-heads carried respectively by said cylinders and rams having laterally projecting sleeves slidable in the frame and engageable with pins projecting inwardly from bars carrying the two series of runners, with means for independently introducing fluid pressure selectively to opposite ends of said ram and for allowing such pressure to dissipate.

11. A ditching machine comprising a frame having top and bottom plates with forward extensions, movable ditch wall compaction means carried by said frame, propelling means floatingly carried by the frame and connected to said wall compaction means, and a steering device comprising eccentrics rotatably mounted in the forward extensions, means for selectively rotating said eccentrics, and a shaft connected between said eccentrics.

12. A ditching machine as claimed in claim 11 characterized by the fact that the means for rotating said eccentrics comprises a lever directly connected to the eccentric on the upper extension and a second lever associated with the first-mentioned lever and connected with a second shaft passing through the first shaft which is a tube and extending below such tube and being affixed to the eccentric in the lower extension.

OLIVER B. TWEETEN.

REFERENCES CITED

The following references are of record in the file of this patent:

UNITED STATES PATENTS

| Number | Name | Date |
|---|---|---|
| 2,136,911 | Briscoe | Nov. 15, 1938 |
| 2,167,500 | Dornfeld | July 25, 1939 |
| 2,320,855 | Dukes | June 1, 1943 |